(No Model.)
C. J. KIRK.
HARROW.
No. 454,825. Patented June 23, 1891.
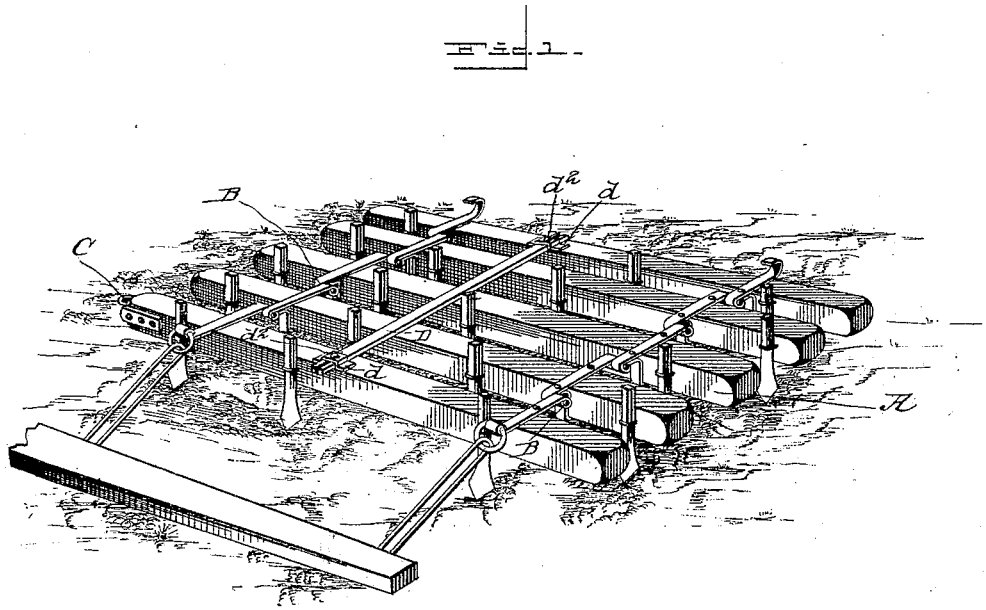
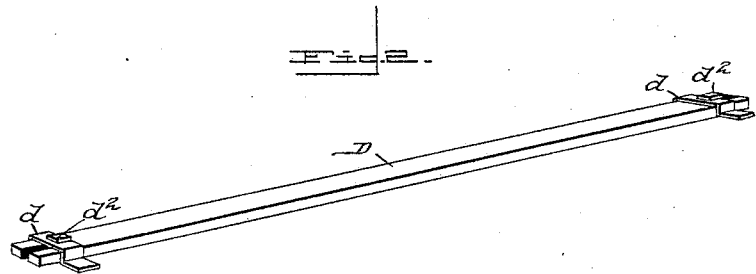
WITNESSES
Charles J. Kirk,
INVENTOR
by R. S. Dyrenforth,
Attorney

UNITED STATES PATENT OFFICE.

CHARLES J. KIRK, OF NEW CASTLE, LAWRENCE COUNTY, PENNSYLVANIA.

HARROW.

SPECIFICATION forming part of Letters Patent No. 454,825, dated June 23, 1891.

Application filed December 4, 1890. Serial No. 373,567. (No model.)

*To all whom it may concern:*

Be it known that I, CHARLES J. KIRK, a citizen of the United States, residing at New Castle, in the county of Lawrence and State of Pennsylvania, have invented certain new and useful Improvements in Harrows; and I do hereby declare the following to be a full, clear, and exact description of the invention, such as will enable others skilled in the art to which it appertains to make and use the same.

This invention relates to harrows.

The object of the invention is to produce a harrow which by the removal or application of a simple attachment may readily and quickly be adapted for use either in mellow or hard soil, and this without requiring any particular construction of the implements as at present made.

With this object in view the invention consists in a harrow comprising a series of hinged tooth-bars provided with the usual or any other suitable form of harrow-teeth and a bar of wood or metal attached transversely to the tooth-bars, adapted to lie along the top thereof to prevent displacement of the bars while going over rough, hard, or uneven ground, the bar being so attached to the tooth-bars as to allow a limited play, in order to avoid damage to the implement in case the teeth come in contact with any obstruction, as a stone or the like.

The invention is illustrated in the accompanying drawings, in which—

Figure 1 is a perspective view of the harrow made in accordance with my invention, and Fig. 2 is a detail view showing the form of stiffening-bars employed.

In the drawings, A represents the tooth-bars, which are connected by means of hinge-joints B, permitting, when ordinarily arranged, the free independent up-and-down movement of the bars. Any desired number of sections may be employed and connected by the hooks and links C to increase or diminish the width of the harrow and adapt it to the use of any desired number of horses.

D represents my improved bar designed to be attached to the outside of the tooth-bars in any suitable manner to hold the bars rigidly together, and at the same time permitting the bars to yield should the teeth strike any obstruction, as a stone or the like. The preferred manner of attaching the bars is by loops $d$, arranged on the outside bars to receive the ends of the bar D, the bars being confined in the loops by the bolts $d^2$. In order to allow suitable play of the bar in the loops in the case of the bending of the bar by reason of the teeth coming in contact with any obstruction, the ends of the bar are slotted a short distance inward, and the bolts by which the bar D is attached to the tooth-bars play in this slot. By this arrangement it will be seen that I am enabled to place the harrow in condition for work on hard or uneven ground, where it is necessary to rigidly hold the teeth to their work, and that without endangering the implement should the teeth come in contact with any obstruction.

Having thus described my invention, what I claim as new, and desire to secure by Letters Patent, is—

A harrow consisting of a series of hinged tooth-bars provided with a stiffening-bar attached to the tooth-bars by means of loops and bolts, the stiffening-bar being provided with slotted ends, substantially as described.

In testimony whereof I affix my signature in presence of two witnesses.

CHARLES J. KIRK.

Witnesses:
 JOHN S. TAGGART,
 J. A. ADDIS.